United States Patent [19]

Maffet

[11] 4,099,336
[45] Jul. 11, 1978

[54] ORGANIC WASTE DRYING PROCESS

[75] Inventor: Vere Maffet, West Chester, Pa.

[73] Assignee: UOP Inc., Des Plaines, Ill.

[21] Appl. No.: 813,578

[22] Filed: Jul. 7, 1977

Related U.S. Application Data

[63] Continuation-in-part of Ser. No. 775,673, Mar. 8, 1977.

[51] Int. Cl.² .............................................. F26B 7/00
[52] U.S. Cl. .......................................... 34/12; 34/60; 34/61; 34/62; 71/12; 71/13; 71/14; 110/221; 110/224
[58] Field of Search ....................... 34/12, 60, 61, 62; 71/12, 13, 14; 110/8 P

[56] References Cited

U.S. PATENT DOCUMENTS

| 2,977,214 | 3/1961 | McLellan | 71/12 X |
| 3,667,131 | 6/1972 | Stephanoff | 34/10 X |
| 4,003,136 | 1/1977 | Vincent | 34/12 |
| 4,057,392 | 11/1977 | O'Donnell | 23/259.1 |

Primary Examiner—Leland A. Sebastian
Attorney, Agent, or Firm—James R. Hoatson, Jr.; John F. Spears, Jr.; William H. Page, II

[57] ABSTRACT

A process for drying organic waste, such as sewage sludge, by contacting the organic waste with hot vapors wherein the dried material is plasticized and extruded to form compacted granules having good flow characteristics and suitable for application by commercial fertilizer spreaders. A plasticizer and an extrusion aid are added to the dried material prior to extrusion.

11 Claims, 1 Drawing Figure

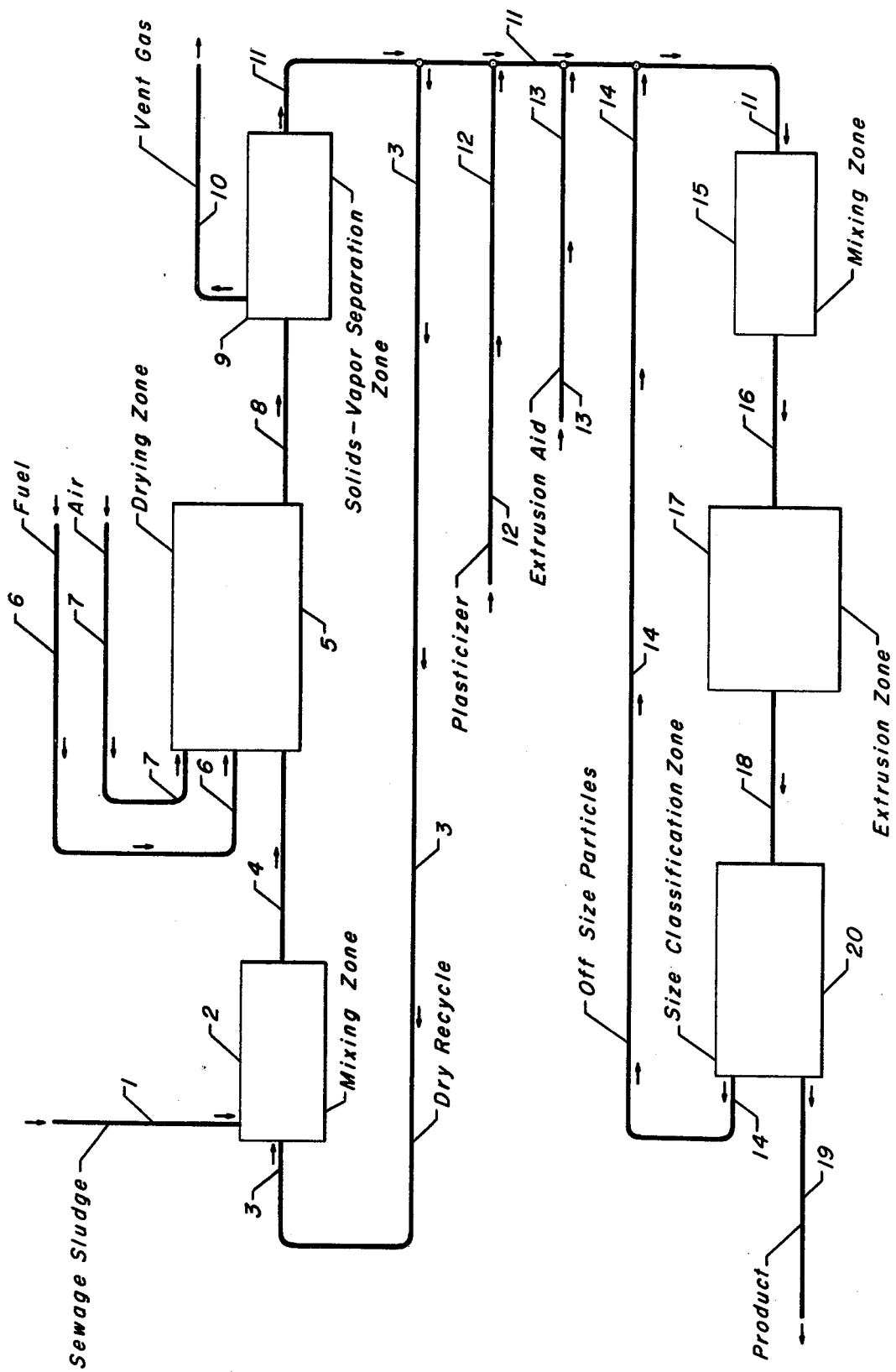

ORGANIC WASTE DRYING PROCESS

CROSS-REFERENCE TO RELATED APPLICATION

This application is a Continuation-In-Part of my prior copending application Ser. No. 775,673 filed Mar. 8, 1977.

FIELD OF THE INVENTION

The invention relates to the drying of solid material by contacting the solid material with hot vapors. The invention also relates to the drying of organic waste, such as sewage sludge, and to the production of fertilizer or soil builders from organic waste. The invention further relates to the conversion and finishing of the dried organic material to a more commercially acceptable and marketable form by plasticization and pelletization in an extruder.

PRIOR ART

The large amounts of organic waste which are produced annually and the need to dispose of this waste have prompted attempts to develop economic organic waste disposal methods. Increasingly stringent environmental standards have also acted as a stimulus to their development. One well known method is that utilized in metropolitan Milwaukee, Wis., to dry municipal sewage sludge to produce an organic plant food caled Milorganite. It is believed that the sludge is dried by the use of large rotating kilns through which hot vapors are passed. A different system in which a flash dryer is used is in operation in Houston, Texas. It is therefore known in the art to dry organic waste by contact with hot vapors.

The prior art processes have two other features in common with the subject process. First, the vaporous effluent of the drying zone is often passed into a solids-vapor separation zone to collect or remove particles of the solid product. This zone typically comprises one or more cyclone-type separators. Second, it is known in the art to recycle a portion of the dried product and to admix this dry material with the incoming feed material to form a somewhat drier charge material which is fed to the drying zone. This procedure is primarily intended to expedite the feeding of the organic waste into the drying zone and to lessen accumulation of the raw waste material on the walls of the drying zone.

The preferred toroidal drying zone is well described in the literature. It is described for instance in United States Patent No. 3,329,418 (Cl. 263-21); 3,339,286 (Cl. 34-10); 3,403,451 (Cl. 34-10); 3,546,784; 3,550,921 (Cl. 263-53); 3,648,936 (Cl. 241-5); 3,667,131; 3,856,215 (Cl. 241-39); 3,922,796 and 3,945,130. The use of such a dryer in a process for the treatment of organic wastes is taught in U.S. Pat. No. 3,802,089 (Cl. 34-8). This reference shows the discharge of the toroidal dryer being directed into a cyclone separator and the recycling of the separator off-gas to the drying zone. The preferred toroidal dryer may be similar in structure to the size reduction apparatus referred to as a fluid energy or jet mill. This apparatus is described at pages 8-43 of the 4th Edition of The Chemical Engineers' Handbook published by McGraw-Hill Book Co., 1963. The subject dryer is operated in a manner similar to many of these mills except for the use of heated gas streams as the high-velocity streams charged to the apparatus.

Previously cited U.S. Pat. No. 3,802,089 is particularly pertinent for its disclosure of the admixture of various additives into the dried material prior to the pelletization of the dried material. The additives disclosed include nutrients to enhance the composition of the product fertilizer and clay, diatomaceous earth and the like which, when added to the soil, improve drainage qualities and improve the soil. Another class of disclosed additives are thickening agents and the like for the fertilizer products themselves.

It is believed that heretofore the effluent of the drying zone has not been extruded except as taught in my prior copending application. Instead, is has typically been compressed as in a roller compacting mill to form sheets or flakes which were then passed into a crushing or granulating device. The resultant granules are then screened to remove fines and oversized particles which are recycled. Material produced in this manner normally has poor flow characteristics and is difficult to mix and to apply with any conventional equipment.

BRIEF SUMMARY OF THE INVENTION

The invention provides an improved process for drying solid organic wastes by contact with a hot vapor. The invention also provides an improved finishing operation for use with such a process. The subject drying process includes the steps of collecting dried solid waste particles from the effluent of the drying zone, admixing a plasticizer, such as formaldehyde, and an extrusion aid into the dried material and then passing the dried material through an extrusion zone. The process provides a more uniform product than the prior art compaction methods and thereby reduces the amount of product which is of an unacceptable size and which must be recycled within the process. The addition of the plasticizer and extrusion aid helps in the production of a high quality product and also eases the extrusion of the dried material.

DESCRIPTION OF THE DRAWING

To ensure a complete understanding of the inventive concept a schematic illustration of the preferred embodiment is presented in the Drawing. In this embodiment an organic waste stream comprising sewage sludge from a municipal treatment center and containing about 20% solids by weight is fed into the process in line 1. This material is passed into a first mixing zone 2 and commingled with a fluffy dry recycle material from line 3. The resultant feed stream is passed into the drying zone 5 through line 4 and contacted in a toroidal dryer with a stream of hot vapors. These vapors are generated by the combustion of fuel entering the process via line 6 with air from a source 7. Preferably, the combustion products are used to form at least part of the hot vapors and are passed directly into the dryer. The drying zone effluent stream carried by line 8 therefore contains the dried solid particles contained in the sewage sludge of line 1, combustion products, and the water vapor driven off the dried sludge.

The drying zone effluent stream is passed into a solids-vapor separation zone 9 wherein the combustion products and water vapor are concentrated into a vent gas stream removed from the process in line 10. The solid particles of dried sludge are collected as a dry solids stream transported in line 11. Preferably, this separation of the solids and vapors is at least partly effected through the use of one or more cyclone-type separators. A first portion of the dry solids stream is recycled through line 3. To the remaining portion of the dry solids stream there is added relatively small streams of a plasticizer from line 12 and an extrusion aid from line 13. Also added to the remaining portion of the dry solids stream is a recycle stream of off-size particles from line 14. All of these streams are fed into a second mixing zone 15 through line 11 and therein admixed to a homogeneous composition.

The effluent of the second mixing zone is passed through line 16 into an extrusion zone 17. In this zone the effluent stream is compacted at conditions of elevated temperature and pressure sufficient to cause the effluent to at least partially plasticize. It is then pushed through a die to produce pellets having a much higher bulk density than the unpelleted dry solids. These pellets are removed in line 18 and passed into a size classification zone 20 as a final finishing step. The pellets are classified according to size as by air blowing or screening, and any dust, undersize particles, and oversize particles are removed for recycling in line 14. The oversize particles may be crushed in a size reduction zone not shown. The finished product is removed in line 19.

DETAILED DESCRIPTION

The drying of organic waste is a multi-step process which may be discussed in terms of the separate steps and their interaction. The overall objective of the process is to dispose of the organic waste and to convert it to a useful an preferably marketable product. In the subject process the organic waste is dired and formed into pellets which may be sold for use as fertilizer, soil conditioner or for other purposes. The inventive concept is mainly concerned with the finishing steps wherein the dried material is formed into pellets, but the other steps will be described in some detail to provide a basis for understanding the invention.

As used herein the term "organic waste"is intended to refer to carbon-containing substances that are derived directly or indirectly from living or formerly living organisms. Specific examples include human sewage, fat, meat scraps, bones, hair, skin, feces and manure from animal sources, beet pulp, fruit pumice, vegetable and fruit peels and culls, eggs, straw and animal bedding, bagasse, fermentation and distillation residues from vegetable sources, cellulose, and protein production plant effluents, kelp, and pharmaceutical wastes. In the preferred embodiment, the feed stream to the process comprises a sewage sludge produced in a municipal sewage treatment plant. It may be a primary, secondary, a tertiary sludge which is digested or undigested. Preferably the feed stream to the process contains about 20 wt.% or more solids.

These organic wastes may be dried to form a slow-release fertilizer and soil builder. In order to distribute such a fertilizer in the large scale operations of modern commercial agriculture, it is necessary to utilize mechanical spreaders for which reason the fertilizer particles should be relatively dense and approximately uniform in size and shape. In the prior art the dried organic waste was compressed to solid pieces which were then crushed to form particles of various sizes and shapes. This method also formed sizable amounts of dust. The product particles then had to be sized as by screening with the off-size material being recycled. The amount of this off-size material has reached over 50% of the material being compressed. My prior application presented an improved finishing and drying operation wherein the dry solids were extruded and the amount of off-size material was reduced.

It is an objective of this invention to provide a process for drying organic waste wherein the product has a relatively uniform size and shape. It is another objective of the invention to provide a process for drying organic waste wherein the product is relatively dense. Another objective is to provide a granular material with good flow characteristics. It is yet another objective of the invention to provide an improved process for the drying of organic waste which produces a particulate product without extensive crushing of the dried and compacted organic waste. A further objective is to provide an improved extrusion method for use with dried organic waste.

Basic to the subject process is the use of a drying zone. This may be any mechanical contrivance in which the organic waste is dried. The dryer may be either a direct or indirect dryer and may operate in a batch or continuous mode. The drying may therefore be effected by contacting the organic waste with a hot surface with intermittent or continuous agitation, but it is preferably accomplished by contacting the organic waste with a hot relatively dry vapor. There are several ways in which this preferred drying may be performed. For instance, the organic waste may be passed into the raised end of a rotating cylindrical kiln while hot dry vapors are passed into the lower end. Other drying systems such as a flash-cage dryer may be used.

In the preferred embodiment, the drying zone comprises a toroidal dryer. As used herein the term "toroidal dryer" is intended to refer to a dryer in which the material to be dried is passed into an enclosed circular housing wherein the wet material is caused to circulate by hot vapours which are charged to the dryer. It is therefore intended to refer to a dryer similar to that described in the previously cited references including U.S. Pat. Nos. 3,802,089; 3,329,418; 3,403,451; 3,667,131 and 3,856,215. The material to be dried is normally passed into a lower point in a vertically oriented dryer housing and caused to move horizontally by the hot vapors. The wet material is then circulated around the vertically aligned circular loop of the dryer, with dry material being selectively removed with the effluent vapors. The drying conditions used in the drying zone include a pressure which may range from subatmospheric to about 7 atmospheres gauge. Preferably, the drying zone is operated at a slight positive pressure with a toroidal dryer. This pressure may be in the range of from about 0.1 to 0.6 atmospheres gauge. This pressure is required for transportation of the solids.

The drying zone may be supplied the heat required to effect the drying from any suitable source. It may therefore be supplied by electricity or by a nuclear power plant. The preferred heating method is the combustion of a relatively sulfur-free carbonaceous fluid such as a desulfurized fuel oil or natural gas. Preferably, the combustion is completed prior to the contact of the resultant hot vapors with the organic waste. The temperature of the hot vapors fed to the dryer may vary from about 500 to 1350° F. A preferred range for this temperature is 750° to 1250° F.

It has been found by experience that a feed stream being fed to a toroidal dryer should contain at least about 50 wt.% solids. Preferably, it contains about 55 to 70 wt.% solids. This degree of dryness is desirable to prevent portions of the feed stream from depositing on the internal surfaces of the dryer. That is, a soupy feed stream has a tendency to plaster against the walls of the dryer with at least a portion remaining there as an undesired coating. The normal method of increasing the solids content of wastes such as municipal sludge is to recycle a portion of the dryer effluent. A representative recycle ratio is the addition of 7 lbs. of dried solids collected from the dryer effluent to 5 lbs. of sludge containing about 20 wt.% solids. This recycle rate will, of course, be adjusted for other solids contents in the organic waste stream fed to the process.

An alternative to the recycling of dried solids is the dewatering of the organic waste stream fed to the process. This can be done in several ways. For instance, U.S. Pat. Nos. 3,984,329; 2,097,529 and 4,008,158 present conveyor-type sludge filtering devices. Other types of presses and filters including those utilizing a vacuum or centrifugal force to promote drainage may be used.

The effluent stream of the dryer will contain the dried organic wastes. This solid material preferably has a water content of about 5–12 wt.%, but higher water conents up to about 15 wt.% may be tolerable. When the drying is achieved through the use of hot vapors, these vapors will also exit the drying zone and will normally contain some entrained fine waste particles. The effluent of the drying zone is therefore passed into a solids-vapor separation zone. This zone preferably contains one or more cyclone separators. Most of the dried waste will be collected by these cyclones. The off-gas of the cyclones may be directed into a wet scrubber such as a turbulent contact absorber or bag-type filter. The filtered off-gas is then passed through an odor scrubber in which contact with deodorizing chemicals including hypochlorites, peroxides, or permanganate can be effected if necessary. An incineration-type odor scrubber may also be used. When the preferred toroidal dryer is used, the dried solids will be removed from the dryer suspended in the warm effluent vapors and passed to the separation zone. These effluent vapors will also comprise the evaporated water and combustion products. They may range in temperature from about 190° to 400° F. and are preferably in the range of 200°–300° F. This separatory zone may be of customary design, and those skilled in the art are capable of effecting its design and operation.

The dried organic waste is normally a fluffy material having a bulk density of about 12 to 16 lb/ft³. The dried material produced from sewage sludge also tends to adhere itself and does not readily flow or spread. It is therefore difficult to transport or to spread as fertilizer. For these reasons, it has been compacted to form a particulate product having an average bulk density of about 30 to 65 lb/ft³. Preferably, the density of the product is about 30 to 50 lb/ft³. The sequential compaction and crushing operations of the prior art did accomplish the necessary compaction. However, the required machines are relatively expensive, troublesome, and often unreliable. Further, the product frequently still has poor flow characteristics. The prior art method also produces a large amount of off-size material as described above. My prior application describes how many of these disadvantages of the prior art can be largely eliminated by extruding the dry material formed in the drying zone.

Use of extrusion has resulted in the total amount of off-size material which must be recycled being below 25%. This reduction is significant compared to the prior art, and allows the process to operate at higher throughput than can be achieved with conventional compaction equipment. It also decreases the required size and utility consumption of the off-size particle recycle system. These advantages are in addition to the lower cost and increased reliability of the extruder. There is also some indication that extrusion results in a product which may be stabilized at a higher water content. Normally, the dried sludge starts to "germinate" if stored at water contents above 10–12%. If a higher water content can be tolerated in the product, the required amount of drying is reduced, fuel is conserved, and the process is more economical. The use of extrusion therefore appears synergistic.

It has now been found that the extrusion step may be benefited in two distinct ways through the admixture of an extrusion aid and a plasticizer into the dried solids material prior to its extrusion. These findings are based upon a series of tests wherein dried organic waste produced from sewage sludge was extruded in a small bench unit having a 2-3/4 inch throat, ⅛ inch die holes, and a ¾ H.P. motor.

TEST 1

Test 1 was a control test in which the dry solids were extruded without any additives. Test 6 was a repeat of this test to verify the results. The extrusion was successful but difficult. It produced suitable pellets, but considerable dust also resulted.

TEST 2

Test 2 was designed to examine the use of starch as an extrusion aid. Fifty grams of dry starch were admixed with 1000 grams of the dried solids and extruded. The result was essentially the same as the control Tests 1 and 6.

TEST 3

Test 3 was designed to determine whether formaldehyde would act as a plasticizer during the extrusion. As formaldehyde is gaseous at standard conditions it was used in the form of a 30 wt.% aqueous solution. This solution contained a small amount of alcohol as is normally utilized to stabilize the solution. One hundred grams of the solution were admixed with 1000 grams of dried solids and extruded. The extrusion was still difficult, but a highly plasticized virtually dust-free extrudate was produced.

TEST 4

In Test 4, 300 grams of the formaldehyde solution were admixed with 1000 grams of the dried solids. The result was a soft extrudate and detectably less difficult extrusion, presumably the result of the higher water content in the feed mixture.

TEST 5

In Test 5, 300 grams of water and 50 grams of starch were admixed with 1000 grams of the dried solids and extruded. The result was similar to that of Test 4, again indicating that the result was attributable to the high water content.

TEST 7

In Test 7, 1000 grams of dried solids were admixed with 50 grams of bentonite (which had previously been admixed with 50 grams of water) and then extruded. The resultant extrudate was similar to the controls with considerable dust being produced. However, the extrusion operation was very much easier.

TEST 8

In Test 8, the same materials as Test 7 (1000 grams dried solids and 100 grams of a 50% water-bentonite admixture) was mixed with 50 grams of the formaldehyde solution and extruded. The results were very easy extrusion and a plasticized and dustless extrudate.

TEST 9

In Test 9, 50 grams of bentonite were mixed into 50 grams of the formaldehyde solution, and this admixture was added to 1000 grams of dried solids and extruded. The results were similar to Test 8 with very easy extrusion and a plasticized, dustless extrudate.

These tests indicate that the addition of formaldehyde and bentonite aided the extrusion process in different ways. The bentonite acted as an extrusion aid which allowed the dried solids to be more readily extruded. The benefits of this improvement include less energy consumption, less strain on the parts of the extruder, and a higher capacity for any given extruder. The tests also indicate that the formaldehyde solution acted as a plasticizer. Its addition decreased the amount of dust and produced a high quality extrudate.

Other plasticizers, which may be thought of or referred to as cross-linking agents, may also be used in the subject process. The use of these materials is still a combination of art and science. It is, therefore, not possible to accurately predict their effectiveness unless the performance of closely related materials has been studied. Many materials which act as plasticizers are described in standard references and they may be easily evaluated by performing the relatively simple tests described above.

The plasticizer may be either an organic or an inorganic compound. A partial list of known organic cross-linking agents which are contemplated for use as plasticizers contains various aldehydes and ketones and includes acetaldehyde, propionaldehyde, butyraldehyde, glycol aldehyde, aldol, glyceric aldehyde, glyoxal, pglyoxal, meso xydialdehyde, acrolein, crotonaldehyde, dibroacrolein, mucochloric acid, o-salicylaldehyde, resorcyclic aldehyde, diacetyl, acetonyl acetone, hydroquinone, camphor, dibutyl phthalate, butyl benzyl phthalate, dimethyl phthalate, diethyl phthalate, aromatic phosphates and sulfonamides, bis(2-ethylhexyl) adipate, dibutyl sebacate, raw castor oil, mineral oil, tricresyl phosphate, alkyd resins, hydrogenated terphenyls, diphenyl phthalate, polyalkylene glycol, butoxyethyl sterate and poly-α-methylstyrene. Some of the known inorganic cross-linking agents contemplated for use as a plasticizer are $Al_2O_3$, $Cr_2O_3$, $Fe_2O_3$, $ZnO_2$, $TiO_2$, $SiO_2$, $Al_2(SO_4)_3$, $Fe(NH_4)(SO_4)_2$, $Ti(NO_3)_4$, and $K_2Al_2(SO_4)_4 \cdot 24H_2O$.

Some materials apparently do not produce any visually observable benefit during the extrusion of the dry solids waste. For instance the starch of Test 2, a lignosulfonate and urea have been found not to function as extrusion aids or plasticizers by themselves. In contrast, bentonite functioned as an extrusion aid but not as a plasticizer. It is contemplated to use gypsum and clay-type materials other than bentonite as extrusion aids. These clay-type materials may be characterized as colloidal or near colloidal mineral mixtures which are rich in hydrated silicates of aluminum, iron or magnesium, hydrated alumina or iron oxide. Examples of these materials are other montmorillonite minerals, fullers earth, kaolin minerals, serpentine minerals, boehmite, gibbsite and bauxitic clays. It is also contemplated that the previously listed cross-linking agents could be used to fulfill the functions of both an extrusion aid and a plasticizer. Bentonite is, however, the preferred extrusion aid.

It is not necessary to utilize both a plasticizer and an extrusion aid, and the subject drying and finishing process may be performed using only one of them. However, it is preferred that both of them are used. It is also preferred that a small amount of water be contained in either of the additives or in both of them, but that the amount of water added to the dry solids not be excessive. It is therefore preferred that the total amount of water added to the dried solids to be extruded is about 1.0–25.0% of the dried solids. More preferably, the total amount of water in the added plasticizer and extrusion aid is from 3–12% of the dried solids.

Basically for reasons of economy, it is preferred that neither the extrusion aid nor the plasticizer equal more than 30 wt.% (including water) of the dried solids. The total amount of the two additives on a water-free basis should be less than 15 wt.% and is preferably less than about 10 wt.% of the dry solids to which it is added. The two additives may be premixed and then combined with the dried solids or each may be individually admixed with the dried solids stream. The order of admixture is not believed to be significant. Customary mixing systems known to those skilled in the art may be utilized to perform this admixture and also to effect the mixture of any recycled dried solids with the organic waste feed stream. Other additives known in the art, including those added to increase the nutrient value of the product, may also be blended into the dry solids prior to extrusion.

In accordance with this description one embodiment of the invention may be characterized as a process for drying organic waste which comprises the steps of passing a feed stream comprising water and organic waste into a drying zone operated at drying conditions and effecting the evaporation of water contained in the feed stream, and the production of a drying zone effluent stream comprising particulate organic waste and water vapor; separating the drying zone effluent stream in a solids-vapor separating zone and producing a vapor stream comprising water vapor an a dry solids stream comprising particulate organic waste and containing less than about 15 wt.% water; admixing a plasticizer into at least a first portion of the dry solids stream, with the amount of plasticizer which is added being less than 5 wt.% of the first portion of the dry solids stream; admixing an extrusion aid with the first portion of the dry solids stream, with the amount of the extrusion aid which is added being less than 10 wt.% of the first portion of the dry solids stream, and with the total amount of plasticizer and extrusion aid being equal to less than 15 wt.% of the first portion of the dry solids stream on a water-free basis; and extruding the first portion of the dry solids stream in an extrusion zone under conditions sufficient to cause at least partial plasticization of the dry solids and the formation of a product stream having a bulk density within the range of about 30–65 lb/ft$^3$.

The extrusion of the dry fluff may be performed in a customary manner using several types of extruders including press-type extruders. The preferred type of extrusion apparatus uses a screw or auger to force the dried organic waste through a face plate having perforations in the range of one-sixteenth to ¼ inch diamater. The action of the screw within the barrel of the extruder results in the shearing and kneading of the dried waste, and the waste is therefore fluxed into a plasticized material within the barrel, with the plasticized material solidifying upon discharge from the extruder. This plasticizing is believed to be at least in part responsible for the improved performance of the subject process. The dried waste may be fed to the extruder at the elevated temperature at which it exits the solids-vapor separation zone to promote fluxing. The temperature and pressure within the extrusion zone should be sufficient to effect the plasticization of the dried solids. A pressure of 500 psig. or more at about 300° F. or higher has been found suitable. Uniform pellet formation may be aided by the use of a rotating finger plate on the extruder face plate.

The extrudate is then passed into a particle classification or fines separation zone. The zone may comprise any apparatus which will remove dust, fine particles, and oversized particles from the extrudate. One such apparatus comprises a screening mechanism having two vibrating screens to sort out those particles which will not pass through a 6 mesh screen and also those that pass through a 20 mesh screen. The remaining product is referred to as "minus 6 plus 20" and is typical of the size range preferred in fertilizer production. The oversize may be crushed in any suitable manner and returned to the screens. The fines are recycled to the feed of the extruder. A second type of apparatus which may be used is one which utilizes fluidization of the fine particles in air as a means of particle classification. The apparatus presented in U.S. Pat. No. 3,825,166 performs fine particle separations in this manner.

I claim as my invention:

1. A process for drying organic waste which comprises the steps of:
   (a) passing a feed stream comprising water and organic waste into a drying zone operated at drying conditions and effecting the evaporation of water contained in the feed stream, and the production of a drying zone effluent stream comprising particulate organic waste and water vapor;
   (b) separating the drying zone effluent stream in a solids-vapor separating zone and producing a vapor stream comprising water vapor and a dry solids stream comprising particulate organic waste and containing less than about 15 wt.% water;
   (c) admixing a plasticizer into at least a first portion of the dry solids stream, with the amount of plasticizer which is added being less than 5 wt.% of the first portion of the dry solids stream; and,
   (d) extruding the first portion of the dry solids stream in an extrusion zone under conditions sufficient to cause at least partial plasticization of the dry solids and the formation of a product stream having a bulk density within the range of about 30–65 lb/ft$^3$.

2. The process of claim 1 wherein an extrusion aid is admixed with the first portion of the dry solids stream at a rate of less than 10 wt.% of the first portion of the dry solids stream.

3. The process of claim 1 wherein the plasticizer comprises a formaldehyde solution.

4. The process of claim 2 wherein the plasticizer comprises a formaldehyde solution.

5. The process of claim 4 wherein the extrusion aid comprises bentonite.

6. The process of claim 2 wherein the total amount of water in the plasticizer and in the extrusion aid is from 1–25 wt.% of the first portion of the dry solids stream.

7. The process of claim 6 wherein the drying zone comprises a toroidal dryer.

8. The process of claim 3 wherein a second portion of the dry solids stream is internally recycled within the process and forms part of the feed stream passed into the drying zone.

9. A process for drying organic waste which comprises the steps of:
   (a) passing a feed stream comprising water and organic waste into a drying zone operated at drying conditions and effecting the evaporation of water contained in the feed stream, and the production of a drying zone effluent stream comprising particulate organic waste and water vapor;
   (b) separating the drying zone effluent stream in a solids-vapor separating zone and producing a vapor stream comprising water vapor and a dry solids stream comprising particulate organic waste and containing less than about 15 wt.% water;
   (c) admixing an extrusion aid into at least a first portion of the dry solids stream, with the amount of plasticizer which is added being less than 5 wt.% of the first portion of the dry solids stream; and,
   (d) extruding the first portion of the dry solids stream in an extrusion zone under conditions sufficient to cause the plasticization of the dry solids and the formation of a product stream having a bulk density within the range of about 30–65 lb/ft$^3$.

10. The process of claim 9 wherein the extrusion aid comprises bentonite.

11. The process of claim 9 wherein the dry solids are at a temperature above 300° F. during the extrusion.

* * * * *